US008390895B2

(12) United States Patent
Mitchell et al.

(10) Patent No.: US 8,390,895 B2
(45) Date of Patent: Mar. 5, 2013

(54) COLOR CONVERSIONS IN THE REAL DOMAIN

(75) Inventors: Joan L. Mitchell, Longmont, CO (US);
Yue Qiao, Longmont, CO (US); Nenad Rijavec, Longmont, CO (US)

(73) Assignee: Ricoh Production Print Solutions LLC, Boulder, CO (US)

(*) Notice: Subject to any disclaimer, the term of this patent is extended or adjusted under 35 U.S.C. 154(b) by 1087 days.

(21) Appl. No.: 12/271,187

(22) Filed: Nov. 14, 2008

(65) Prior Publication Data

US 2010/0123910 A1    May 20, 2010

(51) Int. Cl.
*H04N 1/40*    (2006.01)
(52) U.S. Cl. ........ 358/3.23; 358/1.9; 358/518; 358/523; 382/162; 382/167
(58) Field of Classification Search .......... 358/1.9, 358/3.23, 518, 523; 382/162, 167
See application file for complete search history.

(56) References Cited

U.S. PATENT DOCUMENTS

| | | | |
|---|---|---|---|
| 6,115,031 A * | 9/2000 | Love et al. | 345/603 |
| 6,256,422 B1 | 7/2001 | Mitchell et al. | |
| 6,667,815 B1 | 12/2003 | Nagao | |
| 6,678,423 B1 | 1/2004 | Trenary et al. | |
| 6,985,252 B1 | 1/2006 | Kubo | |
| 7,002,627 B1 | 2/2006 | Raffy et al. | |
| 7,440,138 B2 * | 10/2008 | Hofman | 358/3.01 |
| 2004/0105581 A1 | 6/2004 | Sawada | |
| 2004/0114166 A1 | 6/2004 | Kubo | |
| 2005/0276501 A1 * | 12/2005 | Nakayama et al. | 382/251 |
| 2006/0193513 A1 * | 8/2006 | Minamino | 382/165 |
| 2006/0210156 A1 | 9/2006 | Lei et al. | |
| 2006/0250645 A1 | 11/2006 | Miyazaki | |
| 2007/0013926 A1 * | 1/2007 | Miyata | 358/1.9 |
| 2007/0025617 A1 * | 2/2007 | Dai et al. | 382/180 |
| 2007/0058184 A1 | 3/2007 | Kodama | |
| 2007/0188814 A1 | 8/2007 | Walton et al. | |
| 2007/0201058 A1 | 8/2007 | Rajan et al. | |
| 2008/0055614 A1 | 3/2008 | Qiao et al. | |

FOREIGN PATENT DOCUMENTS

JP    2007166562 A    6/2007

OTHER PUBLICATIONS

Jinghong et al., "Development of Image Processing System Based on DSP and FPGA," 8th International Conference on Electronic Measurement and Instruments, Aug. 16-Jul. 18 2007, pp. 2-791 to 2-794.
Tanaka et al., "Neighbor Pixel Mixture," 18th International Conference on Pattern Recognition, 2006, vol. 3, pp. 647-650.

* cited by examiner

*Primary Examiner* — King Poon
*Assistant Examiner* — Jamares Q Washington
(74) *Attorney, Agent, or Firm* — Duft Bornsen & Fettig, LLP

(57) ABSTRACT

Methods and systems herein provide for color conversion in the real domain from an input color space to an output color space using a color conversion table that includes color values defined in the output color space corresponding to color values in the input color space, a table of scaling factors, and a conversion engine operable to group the real domain image data into blocks of pixels. The conversion engine, for each block of pixels, converts a color value in the block of pixels from the input color space to the output color space according to the color conversion table, computes differences between the color value and color values of pixels in the block, scales the computed differences according to the table of scaling factors, and adds the scaled differences to the converted color values to convert the pixel color values to the output color space.

9 Claims, 8 Drawing Sheets

COLOR CONVERSIONS IN THE REAL DOMAIN

BACKGROUND OF THE INVENTION

1. Field of the Invention

The present invention relates to image color conversions and more particularly to converting image data from an input color space to an output color space in the real domain.

2. Statement of the Problem

Image data from an input device, such as a digital camera or scanner, is often defined by a color space that does not directly map to the color space of an output device, such as a printer or a computer monitor. A color conversion process is therefore used to convert the color space of the input image data to the color space of the output device. For instance, a color in the Red, Green and Blue (RGB) color space may require mapping to the Cyan, Magenta, Yellow, and Black (CMYK) color space, and vice versa. Moreover, many printers print in black ink or toner such that the output color space is rendered in "halftone" grayscale values. Thus, if the input color value is in the CMYK color space, then the CMYK color is converted to the halftone grayscale value for rendering by the "black and white" printer.

While some input image data is compressed, such as images compressed by the Joint Photographic Experts Group (JPEG) compression technique, other input image data exists in the real domain. The pixels in the real domain are typically converted to the output color space in the real domain using a color conversion lookup table. These color lookup tables include color values that map one color value of an input color space to a color value of the output color space. However, these tables are exceptionally compute intensive. For example, perceptual color tables include many thousands of color translations. During a color conversion from an input color space to an output color space, each pixel of the input image data is converted by retrieving an output color space value from the lookup table as it corresponds to the input color space. The input color space values of the image data are thus replaced with the output color space values of the look up table. Since the input color space may contain billions of possible colors, the input color space is commonly covered by a mesh that contains only relatively few points. The lookup table carries the output space values just for the mesh points. For example, a CMYK input space with 8 bits per channel has $2^{32}$ input colors. The lookup tables are often constructed using a 17×17×17×17 mesh, yielding a much more manageable table size. During the color conversion, the input space colors not in a mesh are converted by interpolating the output values for the surrounding mesh nodes. There are several interpolation algorithms known in the art, but all are computationally intensive, especially since they have to be repeated for every one of possibly several million input pixels in the image.

SUMMARY OF THE SOLUTION

Embodiments of the invention solve the above and other related problems with methods and associated systems by providing color conversions in the real domain. In one embodiment, a method of converting real domain image data from a first color space to a second color space includes generating a lookup table comprising color values defined in the second color space that correspond to color values in the first color space and clustering the real domain image data into blocks of pixels. The method also includes, for each block of pixels, converting a color value in the block of pixels from the first color space to the second color space according to the lookup table, computing differences between the color value and color values of pixels in the block (e.g., by component), scaling the computed differences according to a table of scaling factors, and adding the scaled differences to the converted color value to convert the color values of the pixels in the block to the second color space.

In another embodiment, a color conversion system operable to convert real domain image data from an input color space to an output color space includes a color conversion table comprising color values defined in the output color space corresponding to color values in the input color space, a table of scaling factors, and a conversion engine operable to group the real domain image data into blocks of pixels. The conversion engine, for each block of pixels, converts a color value in the block of pixels from the input color space (e.g., the color space of an input imaging device, such as a digital camera) to the output color space (e.g., the color space of an output imaging device, such as a printer) according to the color conversion table, and computes differences between the color value and color values of pixels in the block. The conversion engine also scales the computed differences according to the table of scaling factors and adds the scaled differences to the converted color value to convert the color values of the pixels in the block to the output color space.

In another embodiment, a printing system includes a printer, an imaging device operable to generate image data having color values defined in a first color space. The printing system also includes a printer controller having a color conversion table. The color conversion table includes color values defined in the output color space corresponding to color values in the input color space. The printer controller also includes a table of scaling factors and a conversion engine operable to group the real domain image data into blocks of pixels. For each block of pixels, the conversion engine is operable to convert a color value in the block of pixels from the first color space to the second color space according to the lookup table, compute differences between the color value and color values of pixels in the block, scale the computed differences according to a table of scaling factors, and add the scaled differences to the converted color value to convert the color values of the pixels in the block to the second color space.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
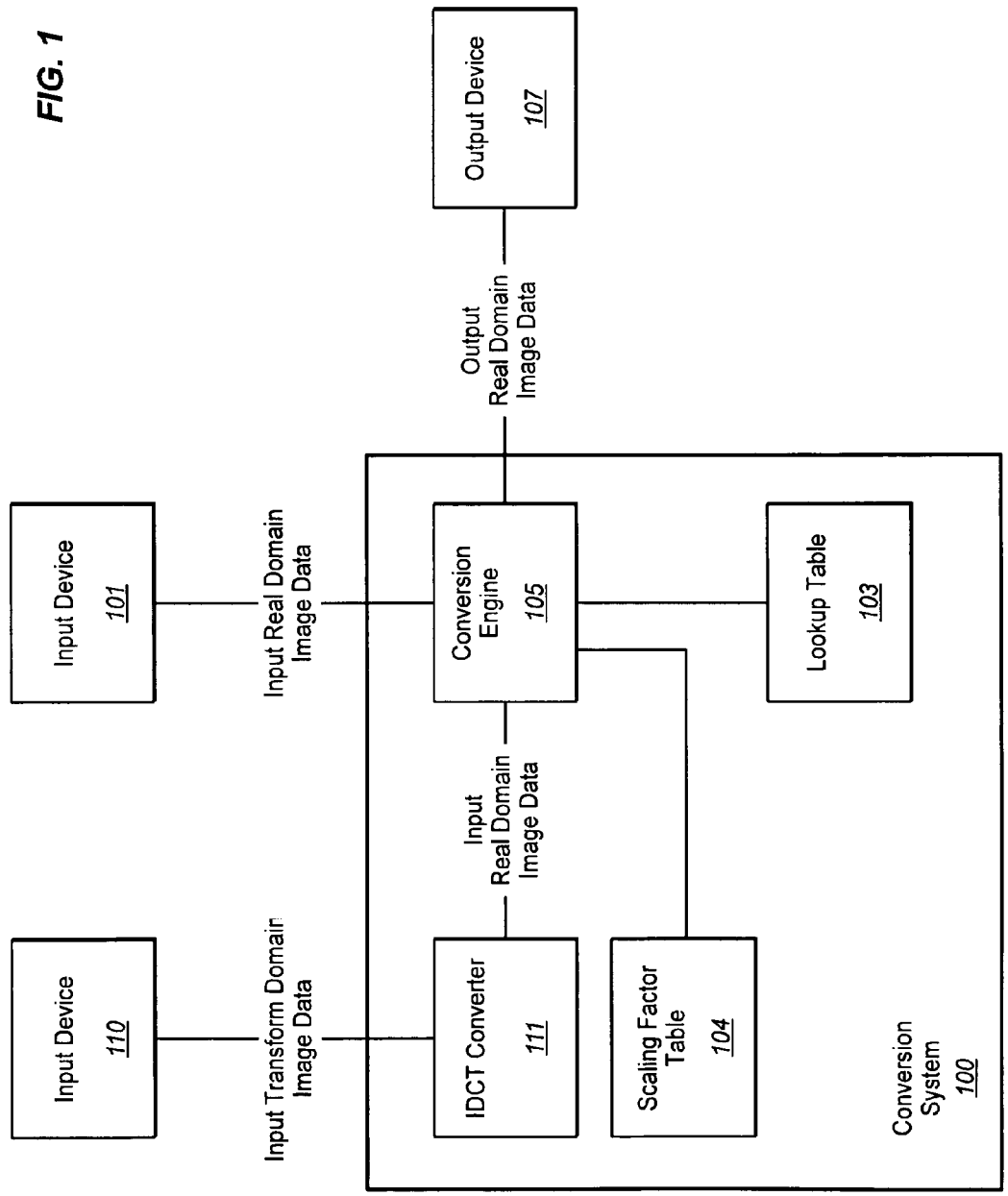
FIG. 1 is a block diagram of a color conversion system operable to convert color values from an input color space to an output color space in the real domain, in one exemplary embodiment of the invention.

FIG. 1 is a block diagram of a color conversion system 100 operable to convert color values in image data from an input color space to an output color space in the real domain, in one exemplary embodiment of the invention. For example, the image data may be acquired from an input device 101, such as a digital camera or a scanner. A user may desire that the image data be presented to an output device, such as a printer or a computer monitor. As is often the case, the output device may have a color space that differs from that of the input device. That is, the output device may not comprise the same array of color values that the input device comprises. Accordingly, the input image data is converted from the input color space to the output color space prior to presentation to the output device. To further illustrate, the color conversion system 100 may map values in an input color space, such as Cyan Magenta Yellow Black (CMYK), Red Green Blue (RGB), or CIEL*a*b*, to a value in an output color space, such as K, CMYK, or RGB. The color conversion system 100 may do so by processing the input image data in the real domain.

To perform the color conversion, the color conversion system 100 includes a conversion engine 105 that receives input image data from the input device 101 in the real domain. The conversion engine 105 may use a lookup table 103 to assist in the conversion of the real domain image data from the input color space of the imaging device to an output color space of another imaging device (e.g., a printer, a computer monitor, etc.). The lookup table 103 may include mappings for less than all of the values in the input color space forming a mesh of values for each input color component that encompasses the range of all possible values for an input color component. If an input value does not match one of the values for the input color space in the lookup table 103, then the conversion engine 105 may interpolate values in the lookup table 103 to determine the output value in the output color space for the input color value.

The conversion engine 105 may also employ a scaling factor table 104. The scaling factor table 104 provides a mapping of an output value in the output color space to a scaling factor to be applied to the input color values. The mapping of output values in the output color space to scaling factors for each color component in the input and output color spaces may be determined from a function for a curve fit to sample data comprising the scaling factors applied to input color values to produce output values in the output color space.

The conversion engine 105 may be operable to generate the scaling factor table 104 by solving over determined linear systems using a least-square method. Overdetermined linear systems are systems having more equations than unknowns. The model may have the form of Ax=d where A is a matrix with more rows or equations than the unknowns in the x vector. Since there are no exact solutions, in one embodiment, the conversion engine 105 may solve x so that the residual vector $r = \|Ax - d\|_p$, where the norm of the residual r is the $L_p$ norm and p has a value of 1 to infinity. However, other suitable algorithms may be used to solve the least square equation, such as the QR factor, SVD, etc. The scaling factors are illustrated in the graphs of FIGS. 2-6. The scaling factors are also illustrated in commonly owned and co pending U.S. patent application Ser. No. 11/469,822 (filed Sep. 1, 2006 and entitled "CONVERTING IMAGE DATA IN AN INPUT COLOR SPACE TO AN OUTPUT COLOR SPACE IN A TRANSFORM DOMAIN"), the entire contents of which are hereby incorporated by reference.

To enhance the color conversion performance (e.g., the speed of color conversion), the conversion engine 105 may initially group the real domain image data into blocks of pixels. Then, for each block of pixels, convert a color value in the block of pixels from the input color space to the output color space according to the lookup table 103. For example, the conversion engine 105 may determine an average color value of the block or select a center pixel of the block and ascertain the color value of that pixel. From there, the conversion engine 105 may convert the color value to the output color space according to the lookup table 103.

The conversion engine 105 also computes differences between the color value and color values of pixels in the block. For example, the conversion engine 105 may determine the per component differences (e.g., C, M, Y, and K differences) between the average color value and all color values of pixels on the block. Alternatively, the conversion engine 105 may determine the differences between the center pixel color value and the color values of all other pixels in the block. Assuming that the differences are within a certain tolerance (e.g., a threshold color value), the conversion engine 105 scales the differences according to the table of scaling factors and adds the scaled differences to the converted color value (i.e., the converted block average color value or the converted center pixel color value) to convert the color values of the pixels in the block to the output color space. If the computed differences exceed a threshold color value, the conversion engine 105 may convert the color values from the input color space to the output color space using the lookup table 103, thus returning to traditional color conversion processing. This return to traditional processing is also shown and described in commonly owned and co pending U.S. patent application Ser. No. 11/469,826 (filed Sep. 1, 2006 and entitled "DETERMINING WHETHER TO CONVERT IMAGE DATA IN AN INPUT COLOR SPACE TO AN OUTPUT COLOR SPACE IN A TRANSFORM DOMAIN OR REAL DOMAIN"), the entire contents of which are hereby incorporated by reference.

To further illustrate, the conversion engine 105 may select an N×M block of pixels (not necessarily square or even fixed) and determine an average color value from the N×M block. The averages may be converted via the lookup table 103. The scaling factors of the scaling factor table 104 may then be used on the differences between the component average and the original input. As long as the differences are not too large, a linear assumption is valid. Otherwise, the conversion engine 105 may abort the conversion and return to traditional color conversion processing. In the center pixel embodiment, after a center pixel has been converted from a first color space to a second color space, then, as long as the differences are small, neighboring pixels may be converted using the scaling factors. If a difference becomes too large, then the system 100 may abort the conversion and return to traditional color conversion processing. Alternatively, two-dimensionality may be preserved by zigzagging through the data. A "look ahead" scheme may determine whether to return to linear scaling for the next set of pixels.

As one example of the computations that may be involved, the system 100 may perform a CMYK to K' conversion using an 8×8 block of pixels for an average. The computations may include 4×64 logical additions and 4 logical shifts to calculate the averages. The averages may then be converted into an average output K' via 15 logical additions and 16 logical multiplications. Another 4×64 logical subtractions determine the differences. The differences may then be multiplied by appropriate scale terms and summed via 4×64 logical multiplications and 3×64 logical additions. The sum may be added into the average output via 64 logical additions, thereby reducing the number of computations required when compared to traditional color conversion processing.

The direction of traversal is not necessarily linear (i.e., either horizontal or vertical). Instead, a traversal route can be defined that best fits the needs of the application. For example, the image data may be divided into blocks and then traversed in a "zigzag" fashion. Since there is no "per block" overhead, blocks may be decidedly smaller.

Consider one exemplary 2×2 block scheme with two scan lines of 8 pixels each, as show in the table below:

| 1 | 2 | 3 | 4 | 5 | 6 | 7 | 8 |
| 9 | 10 | 11 | 12 | 13 | 14 | 15 | 16 |

This configuration may be deemed as four blocks: 1, 2, 9, 10; 3, 4, 11, 12; 5, 6, 13, 14; and 7, 8, 15, 16. The conversion engine 105 may analyze the pixels in the order 1, 2, 9, 10, 3, 4, 11, 12, 5, 6, 13, 14, 7, 8, 15, 16 to select a pixel of the first row but may reset if color differences between the selected pixel and pixels of the second row exceed a certain threshold. Those skilled in the art, however, should readily recognize that other traversal and scaling determinations may be implemented as a matter of design choice.

As another example, the conversion engine may convert a 3×3 block of pixels from CMYK to K'. Previously, the process required 15 logical additions and 16 logical multiplications per pixel assuming the weights are read from a table. Generally, each pixel requires an extra three logical multiplications (assuming a weight factor is a logical multiplication of weights in 4 dimensions), yielding a total of 15 logical additions and 64 logical multiplications.

By using the same 3×3 block of pixels with the novel block average technique, the conversion engine 105 may reduce the number of logical additions and logical multiplications. For example, the conversion engine 105 may compute a block average via 4×7 logical additions calculated from the 8 outside pixels in the 3×3 block. The conversion engine 105 may round the average by adding 4 and then shifting right 2 (e.g., 4 logical additions plus 4 logical shift operations). The averages may then be used to produce a K' average that involves 16 logical multiplications and 15 logical additions). Then the average is used on all nine pixels to look up four scale factors. The differences per component may then be calculated, scaled and summed to a single term that is added to the average K' via 4×9 logical subtractions, 4×9 logical multiplications, and 9×4 logical additions for the 9 pixels, totaling 112 logical additions, 52 logical multiplications, and 4 logical shifts to convert the 9 pixels to 9 K' values, approximately 12 logical additions and 6 logical multiplications per pixel.

With the same 3×3 block of pixels and using the novel pixel differences technique, the center pixel of the 3×3 block is converted to a K' value (16 logical multiplications and 15 logical additions). Then, the 8 nearest neighbors are differenced per component from the center components via 4×8 differences, scaled via 4×8 logical multiplications, summed via 3×8 logical additions, and added to the center K' value via 8 logical additions. This alternative embodiment results in an overall 79 logical additions and 48 logical multiplications, approximately 9 logical additions and 5 logical multiplications per pixel.

Although described with respect to the color conversion system 100 being operable to process real domain image data, the invention is not intended to be so limited. For example, the color conversion system 100 may alternatively or additionally include an inverse discrete cosine transform converter 111 that is operable to receive image data in the transform domain (e.g., a JPEG image), as generated by the imaging device 110, and convert the image data to the real domain via an inverse discrete cosine transform. Upon conversion to the real domain, the converter 111 may transfer the real domain image data to the conversion engine 105 for real domain processing as described above.

Figure 7:
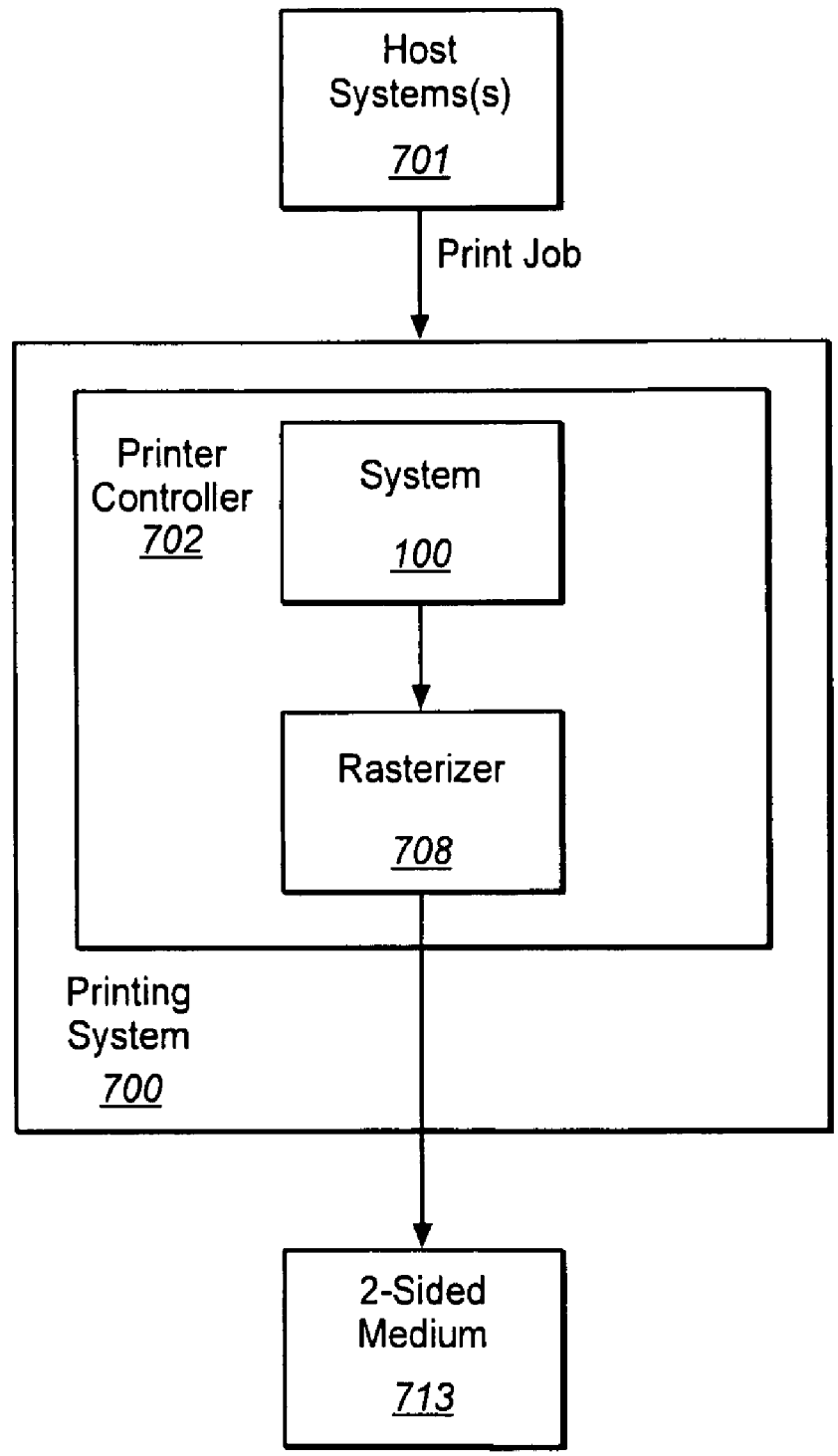
FIG. 7 is a block diagram of a printing system operable to convert color values from an input color space to an output color space in the real domain prior to printing, in one exemplary embodiment of the invention.

The conversion system 100 may be implemented in hardware, software, firmware or a combination thereof to implement to the novel color conversion concepts described herein. For example, the conversion system 100 may be implemented in printer hardware, such as a printer controller, to convert image data of one color space contained in print jobs to the printer's output color space. FIG. 7 below illustrates such with a printing system 700 employing the color conversion system 100 in the printer controller 702.

As discussed, the scaling factor table 104 provides a mapping of an output value in the output color space to a scaling factor to be applied to the color values in the input color space to expedite color conversion processing. The mapping of output values in the output color space to scaling factors for each color component in the input and output color spaces may be determined from a function for a curve fit to sample data comprising the scaling factors applied to input color values to produce color values in the output color space. Examples of such are now shown and described in FIGS. 2 through 6.

Figure 2:
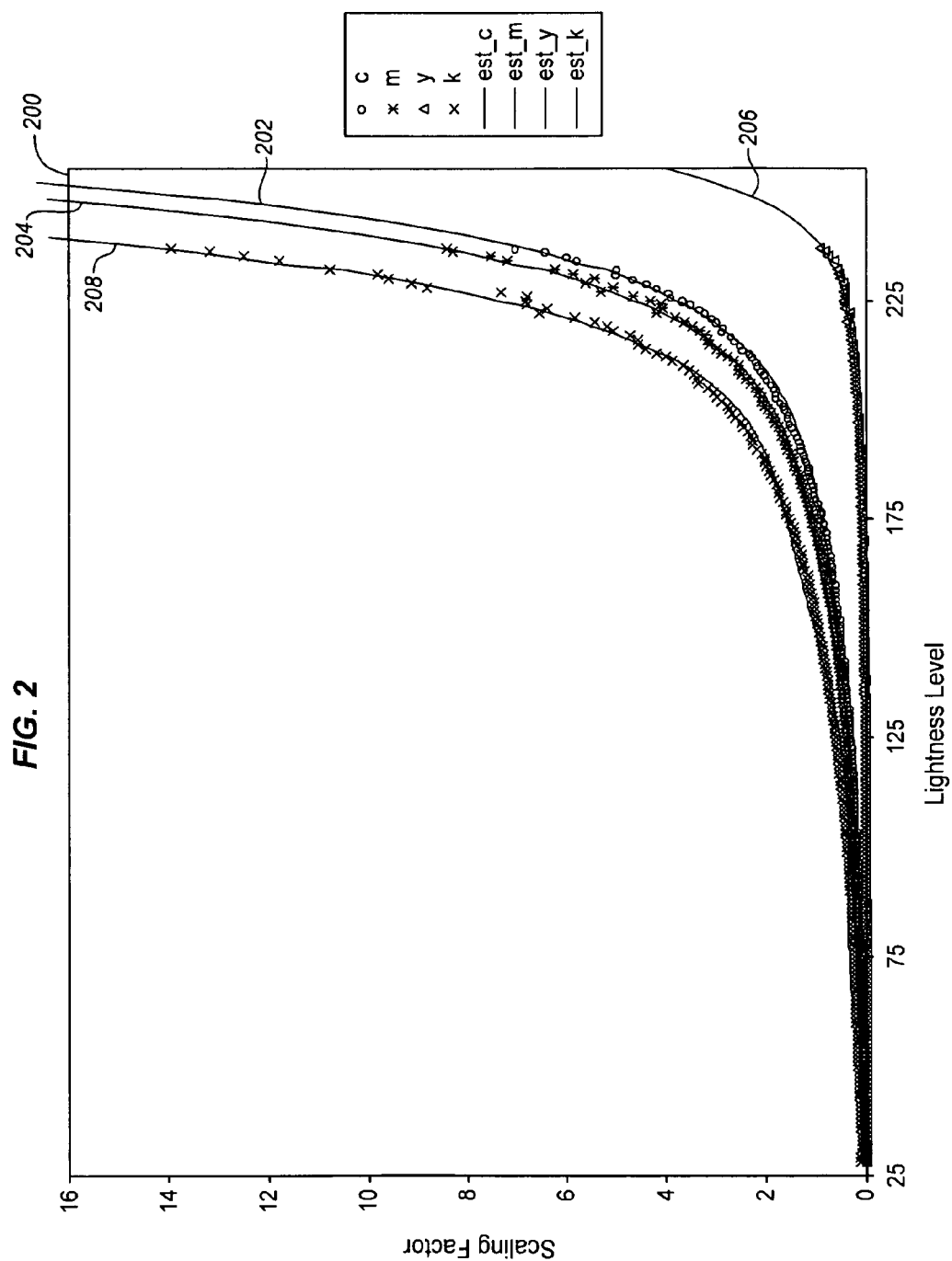
FIG. 2 illustrates curves for CMYK color components fit to data comprising scaling factors for output values in a K color space for a CMYK to K color conversion in one exemplary embodiment of the invention.

FIG. 2 illustrates data showing a graph 200 of scaling factors for each of a C, M, Y, and K color components (on the y axis) for different output values in a K' output color space (on the x axis). For each CMYK input color component, the curves 202, 204, 206, and 208 are fit to the plotting of the scaling factors. The function representing the curve 202, 204, 206, and 208 may be used to determine a scaling factor for one of the CMYK color components for a given K color space output value. The functions representing these curves may then be used to generate the scaling factor table 104, one for each of the input CMYK color components.

FIGS. 3-6 show exemplary graphs of scaling factors for each of the CIEL*a*b* input color components for output values in the CMYK output color space. Thus, there is one graph for each of the output color components CMYK, where each graph provides the functions or curves for each input color component for the output color component. The fit curve for each input color component for an output color component may be used to determine the scaling factors for different output values in the output color space that can be used to form the scaling factor table 104.

Figure 3:
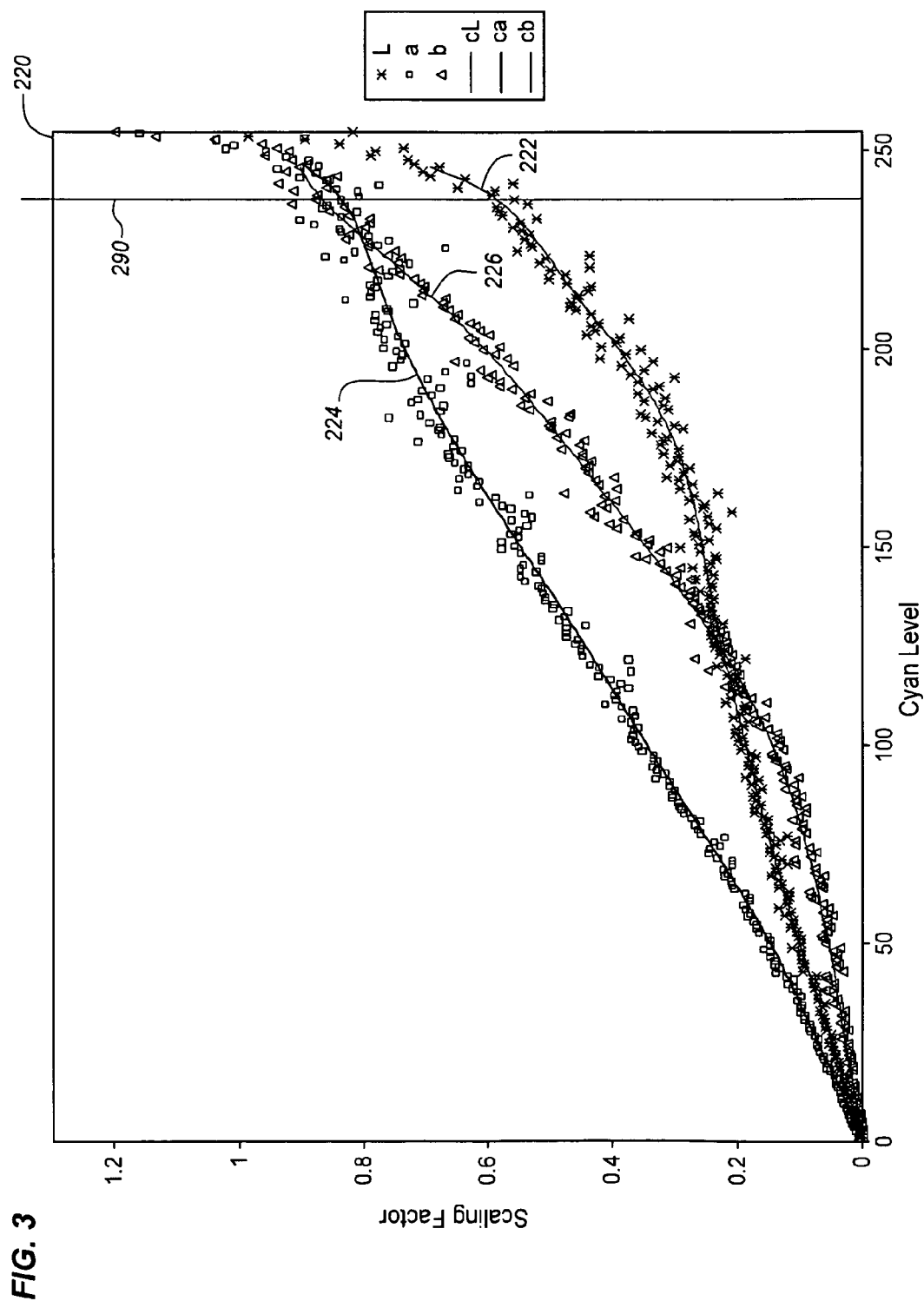
FIG. 3 illustrates curves for CIEL*a*b* (Lab) color components fit to data comprising scaling factors for output values in a CMYK color space for a cyan (C) color component for a Lab to CMYK color conversion in one exemplary embodiment of the invention.

FIG. 3 illustrates data showing a graph 220 of scaling factors for each Lab input color components (on the y axis) for different output values in a CMYK output color space (on the x axis) for the C color component. For each Lab input color component, the curves 222, 224, and 226 are fit to the plotting of the scaling factors. The functions representing the curves 222, 224, and 226 may be used to determine a scaling factor for the input Lab color components for the C output component for a given output value in the CMYK color space. The functions representing these curves 222, 224, and 226 may then be used to generate the scaling factor table 104, having input Lab color components for the C output color components.

Figure 4:
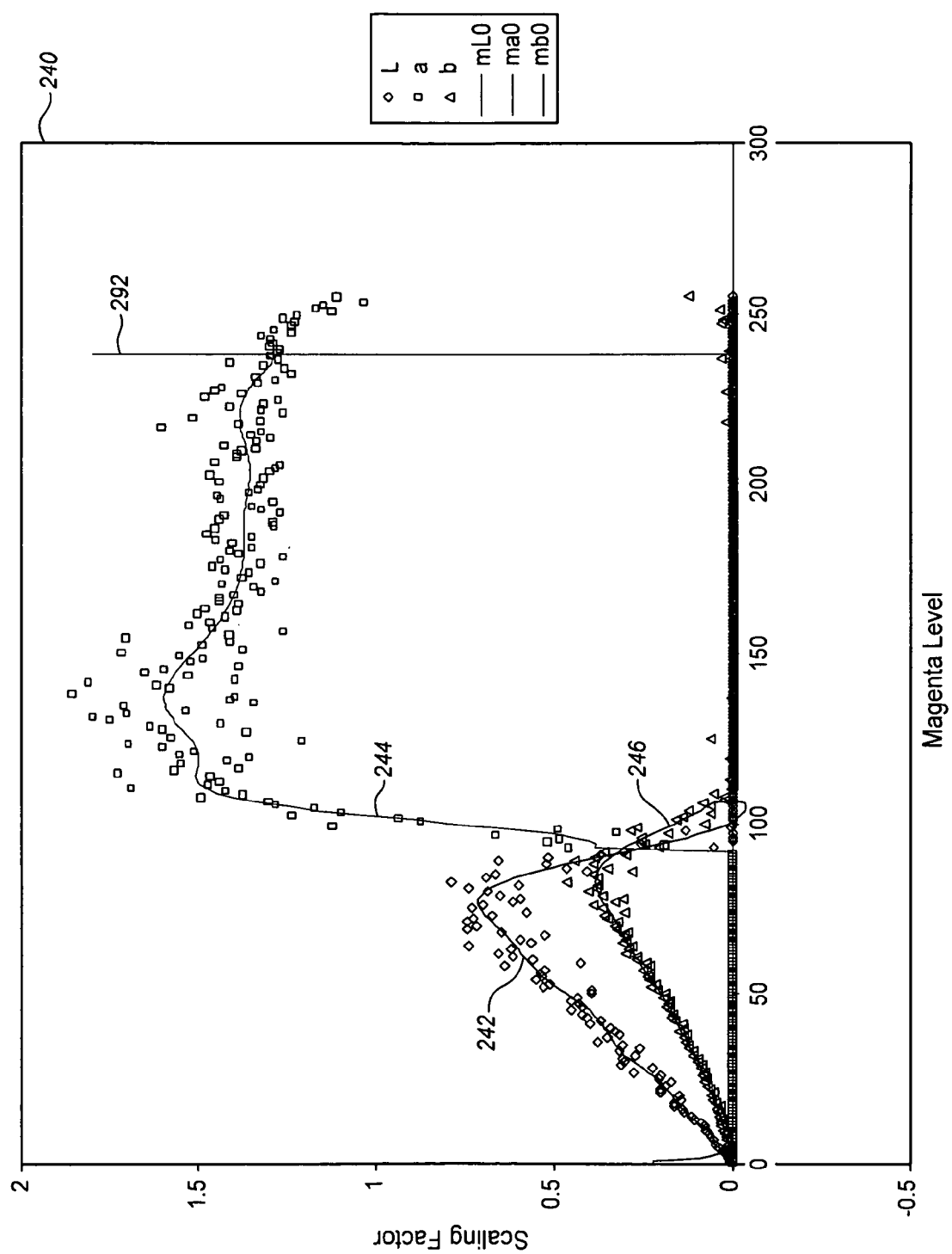
FIG. 4 illustrates curves for Lab color components fit to data comprising scaling factors for output values in a CMYK color space for a Magenta (M) color component for a Lab to CMYK color conversion in one exemplary embodiment of the invention.

FIG. 4 illustrates data showing a graph 240 of scaling factors for each Lab input color components (on the y axis) for different output values in a CMYK output color space (on the x axis) for the M color component. For each Lab input color component, the curves 242, 244, and 246 are fit to the plotting of the scaling factors. The functions representing the curves 242, 244, and 246 may be used to determine a scaling factor for the input Lab color components for the M output component for a given output value in the CMYK color space. The functions representing these curves 242, 244, and 246 may then be used to generate the scaling factor table 104, having input Lab color components for the M output color components.

Figure 5:
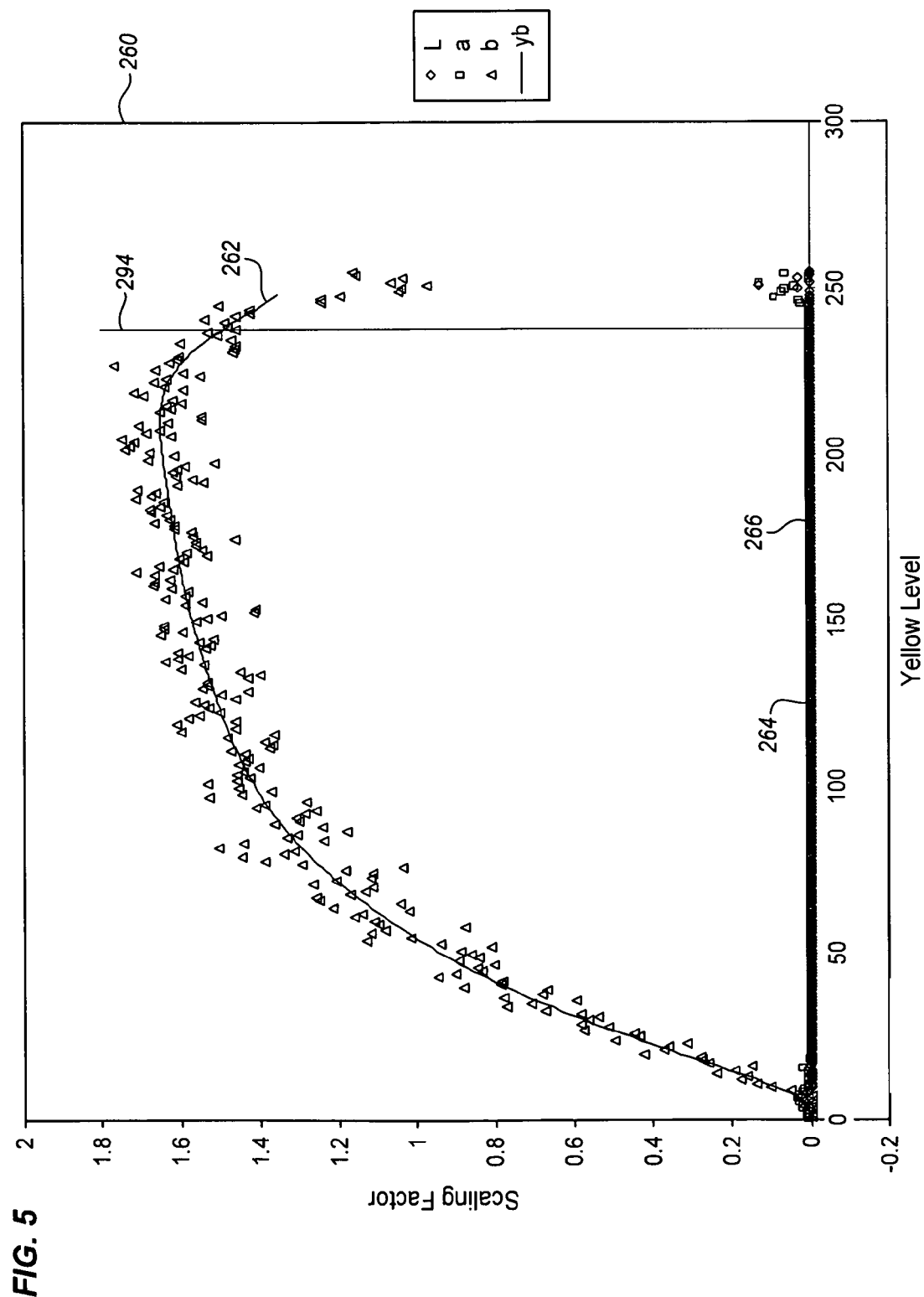
FIG. 5 illustrates curves for each of Lab color components fit to data comprising scaling factors for output values in a CMYK color space for a yellow (Y) color component for a Lab to CMYK color conversion in one exemplary embodiment of the invention.

FIG. 5 illustrates data showing a graph 260 of scaling factors for each Lab input color components (on the y axis) for different output values in a CMYK output color space (on the x axis) for the Y color component. For each Lab input color component, the curves 262, 264, and 266 are fit to the plotting of the scaling factors. The functions representing the curve 262, 264, and 266 may be used to determine a scaling factor for the input Lab color components for the Y output component for a given output value in the CMYK color space. The functions representing these curves 262, 264, and 266 may then be used to generate the scaling factor table 104, having input Lab color components for the Y output color components. The fit curves 264 and 266 for the a and b input color components are both close to providing scaling factor values of zero for most output values for the Y output color component.

Figure 6:
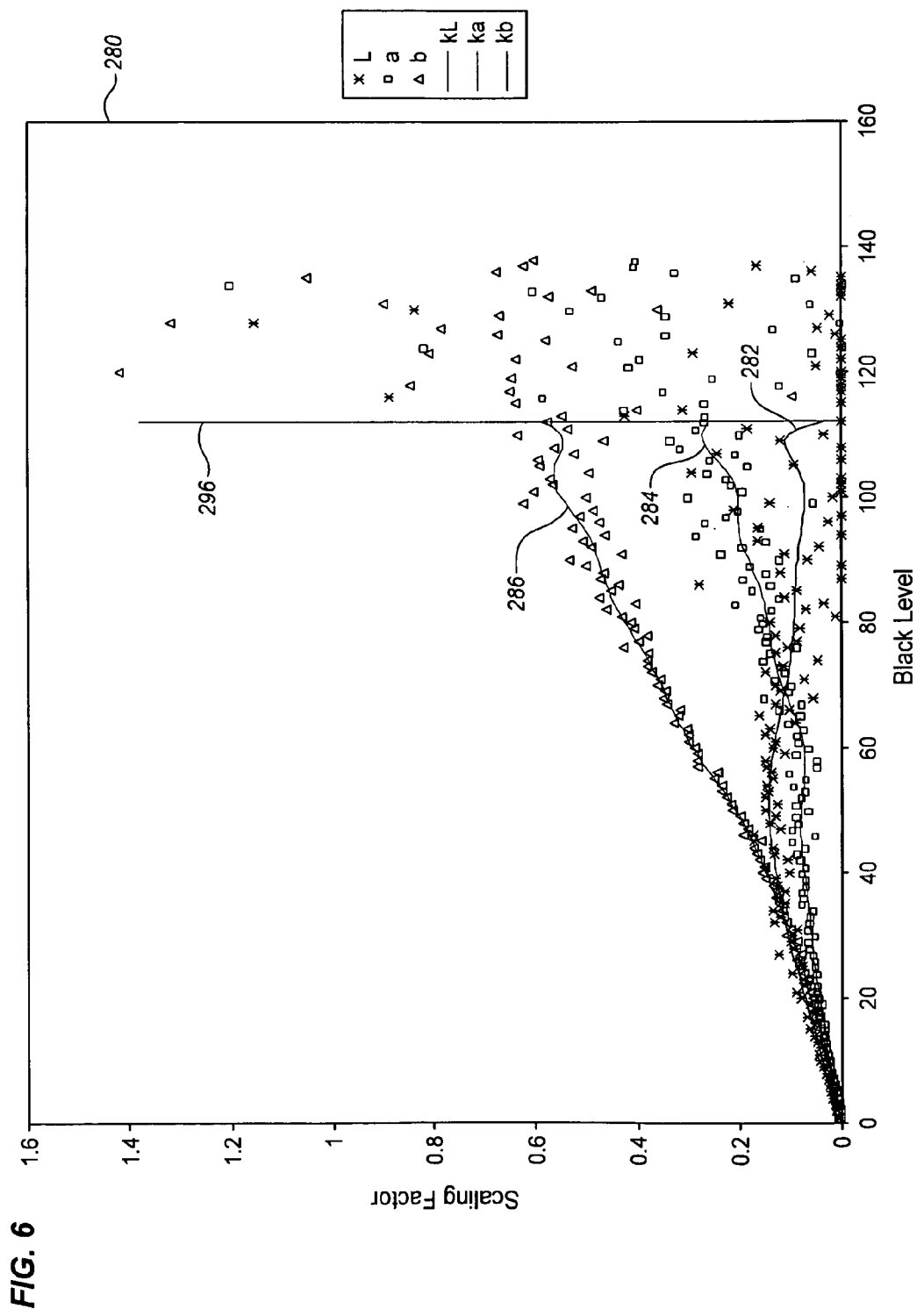
FIG. 6 illustrates curves for Lab color components fit to data comprising scaling factors for output values in a CMYK color space for a black (K) color component for a Lab to CMYK color conversion in one exemplary embodiment of the invention.

FIG. 6 illustrates data showing a graph 280 of scaling factors for each Lab input color components (on the y axis) for different output values in a CMYK output color space (on the x axis) for the K' color component. For each Lab input color component, the curves 282, 284, and 286 are fit to the plotting of the scaling factors. The functions representing the curves 282, 284, and 286 may be used to determine a scaling factor for the input Lab color components for the K' output component for a given output value in the CMYK color space. The functions representing these curves 282, 284, and 286 may then be used to generate the scaling factor table 104, having input Lab color components for the K output color components. The function or curve fit to the data is used to find the missing scaling factor at a certain output level and to smooth the noise in the data.

As mentioned above, FIG. 7 illustrates a printing system 700 employing the color conversion system 100 in the printer controller 702. In this exemplary embodiment of the invention, the printer controller 702 is used to, among other things, convert color values in image data to the color space of a printer. In this regard, the color conversion system 100 may be implemented as software instructions that direct the printer controller 702 to perform the color conversion in a manner as described in the system 100 of FIG. 1. The printing system 700 receives print jobs from one or more host systems 701 that are communicatively coupled to the printing system 700. Thus, when a host system user wishes to print on the two-sided medium 713, the host system user may generate a print job that directs the rasterizer 708 to do so. The printing system 700 includes a printer controller 702 that receives the print job and rasterizes the print job via the rasterizer 708. Rasterization generally regards the conversion of an image described in a vector graphics format into a raster image of pixels such as a bitmap for output to a video display or printer. Examples of the two-sided medium 713 include paper, transparent film, and any other type of material capable of being imprinted.

Prior to rasterization, the color conversion system 100 receives the image data of the print job and performs a color conversion of the color values therein for presentation to the two-sided medium 713. As mentioned, the system 100 may direct the printer controller 702 to process image data having a plurality of color values defined in an input color space and convert the color values to the desired output color space via the block average conversion technique or the center pixel conversion technique described above.

Figure 8:
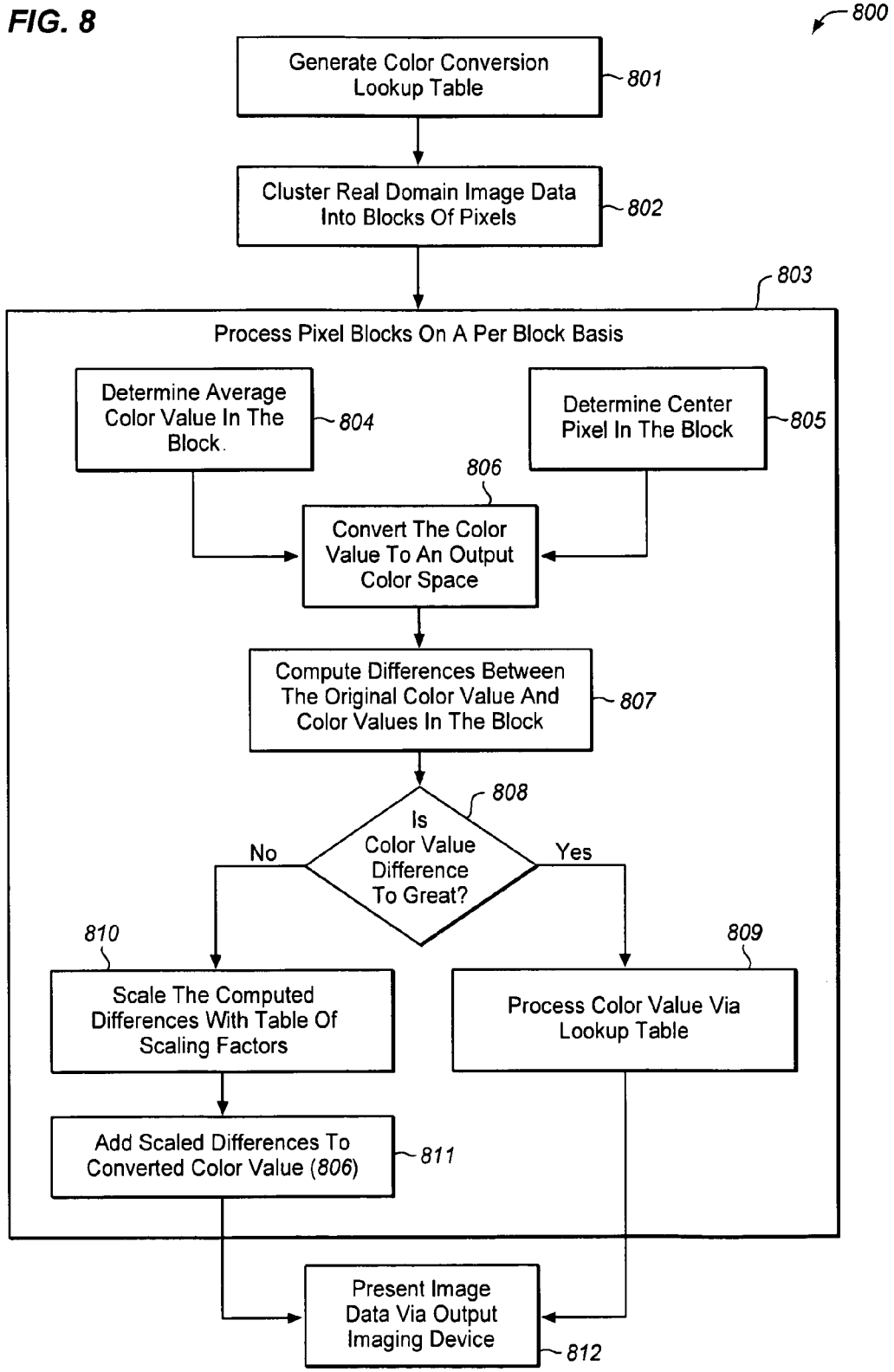
FIG. 8 is a flowchart illustrating a method of color conversion in the real domain in one exemplary embodiment of the invention.

FIG. 8 is a flowchart illustrating a method 800 of color conversion in the real domain in one exemplary embodiment of the invention. In this embodiment, the color conversion system 100 generates a lookup table 103 that includes color values defined in an output color space that correspond to color values an input color space in the step 801. For example, an imaging device such as a scanner or a digital camera may generate image data that requires color conversion to the color space of an output imaging device, such as a printer or a computer monitor. The color conversion system 100 may generate the lookup table 103 of color values such that the input color values may be translated to output color values prior to presentation to the output imaging device. The generation of the lookup table 103 may be performed prior to color conversion based on known color spaces of the input and output imaging devices. In this regard, the color conversion system 100 may process software instructions that direct the system 100 to generate the color conversion lookup table 103 according to a numerical model, empirical parameters, or the like.

As mentioned, the color conversion system 100 may receive the image data from the input device in either the real or the transform domains. However, the color conversion described herein is performed in the real domain. Thus, if the image data is received in the transform domain, the inverse discrete cosine transform converter 111 may convert the image data to the real domain prior to color conversion by the conversion engine 105.

The conversion engine 105 converts the real domain image data by initially clustering the real domain image data into blocks of pixels in step 802. For example, the conversion engine 105 may select N×M blocks of pixels for processing on a block by block basis in step 803. The size and shape of the blocks may be selected as a matter of design choice. Processing of the pixel blocks in step 803 may continue until each of the blocks in the real domain image data are converted from the input color space to the desired output color space.

Processing of the pixel blocks in step 803 may be performed using average colors of the pixel blocks or by identifying center pixels in the blocks. For example, when a block of pixels is processed by the conversion engine 105, the conversion engine 105 may ascertain all of the color values of pixels in the block and determine an average color value for that block in step 804. Alternatively, the conversion engine 105 may identify a numerical center pixel in the block and ascertain the color value of that pixel in step 805. Regardless of the type of processing, the color value is then converted to the desired color space in step 806. For example, the conversion engine 105 may evaluate the color value and assign a color value from the lookup table 103 to the evaluated color value to convert the color value to an output color space.

The conversion engine 105 may also compute per component differences between the original color value (i.e., the block average color value or the center pixel color value) and other color values in the block in step 807. A determination is then made whether the computed color value difference exceeds some threshold color value in step 808. If the computed color value difference for a particular pixel in the block is greater than the threshold color value, then the conversion engine 105 may convert the color value of the pixel to the desired color space using the lookup table 103 in step 809. Otherwise, the conversion engine 105 scales the computed differences using the table of scaling factors 104 (e.g., as illustrated in FIGS. 2-6). Once the color values are scaled, the conversion engine 105 then adds the scaled differences to the converted color value (i.e., of step 806) to convert the color values in that block to the desired color space in step 811. With all of the color values in the block converted to the desired color space (e.g., via steps 811 and/or 809), the converted image data is presented to an output imaging device, such as a printer, in step 812.

Those skilled in the art should readily recognize that the method 800 is merely an exemplary embodiment and not intended to limit the invention. Certain steps may be altered or rearranged while still falling within the scope and spirit of the invention. For example, the differences may be computed prior to conversion of the block average color value or the center pixel color value as they are not necessarily dependent upon one another. That is, determining a difference between the color value, the block average color value or the center pixel color value, and the color values of the block does not depend on converting the color value to the output color space.

Although specific embodiments were described herein, the scope of the invention is not limited to those specific embodiments. The scope of the invention is defined by the following claims and any equivalents thereof. In the context of printing, the invention is not intended to be limited to any particular type of printer. For example, the color conversion described herein may be employed in either ink or toner based printers. Moreover, the color conversion techniques may be employed in printers ranging in size from small household printers to large commercial printers. In one embodiment, the color conversion may be implemented as software instructions operable with a host system to convert colors between various color spaces as needed. For example, software instructions may direct a processing system, such as a general purpose computer, to the color values of image data from one device to the color space of another device prior to presentation to the other device. Regardless of the particular implementation, the various systems and methods described herein provide for a faster color conversion of real domain image data between color spaces.

We claim:

1. A method of converting real domain image data from a first color space to a second color space, the method comprising:

generating a lookup table comprising color values defined in the second color space that correspond to color values in the first color space;

clustering the real domain image data into blocks of pixels; and for each block of pixels:

converting a color value in the block of pixels from the first color space to the second color space according to the lookup table using a conversion engine;

computing differences between the color value and color values of pixels in the block;

scaling the computed differences according to a table of scaling factors; and adding the scaled differences to the converted color value to convert the color values of the pixels in the block to the second color space, wherein converting the color value from the first color space to the second color space according to the lookup table comprises determining an average color value for the block of pixels and converting the average color value to the second color space according to the lookup table, wherein computing the differences comprises computing differences between the average color value and all color values of pixels in the block; and further comprising determining when a computed color value difference of a pixel in the block breaches a threshold color value; and converting the color value of the pixel to the second color space according to the lookup table when the difference breaches said threshold.

2. A method of converting real domain image data from a first color space to a second color space, the method comprising:

generating a lookup table comprising color values defined in the second color space that correspond to color values in the first color space;

clustering the real domain image data into blocks of pixels; and for each block of pixels:

converting a color value in the block of pixels from the first color space to the second color space according to the lookup table using a conversion engine;

computing differences between the color value and color values of pixels in the block;

scaling the computed differences according to a table of scaling factors; and adding the scaled differences to the converted color value to convert the color values of the pixels in the block to the second color space, wherein converting the color value from the first color space to the second color space according to the lookup table comprises determining a center pixel from the block of pixels and assigning a color value of the second color space to the center pixel according to the lookup table, wherein the center pixel has a color value in the first color space prior to converting, wherein computing the differences comprises computing differences between the color value of the center pixel and the color values of all other pixels in the block; and further comprising determining when a computed color value difference of a pixel in the block breaches a threshold color value; and converting the color value of the pixel to the second color space according to the lookup table when the difference breaches said threshold.

3. The method of claim 1, further comprising generating the scaling factors as a function of color values in the second color space per component of color values in the first color space.

4. A color conversion system operable to convert real domain image data from an input color space to an output color space, comprising:

a color conversion table comprising color values defined in the output color space corresponding to color values in the input color space; a table of scaling factors;

a conversion engine operable to group the real domain image data into blocks of pixels, and for each block of pixels, convert a color value in the block of pixels from the input color space to the output color space according to the color conversion table, compute differences between the color value and color values of pixels in the block, scale the computed differences according to the table of scaling factors, and add the scaled differences to the converted color value to convert the color values of the pixels in the block to the output color space, wherein the conversion engine is further operable to determine an average color value for the block of pixels and convert the average color value to the output color space according to the color conversion table, wherein the conversion engine is further operable to compute differences between all color values of pixels in the block and the average color value, wherein the conversion engine is further operable to determine when a computed color value difference of a pixel in the block breaches a threshold color value and convert the color value of the pixel to the output color space according to the color conversion table when the difference breaches said threshold.

5. A color conversion system operable to convert real domain image data from an input color space to an output color space, comprising:

a color conversion table comprising color values defined in the output color space corresponding to color values in the input color space; a table of scaling factors;

a conversion engine operable to group the real domain image data into blocks of pixels, and for each block of pixels, convert a color value in the block of pixels from the input color space to the output color space according to the color conversion table, compute differences between the color value and color values of pixels in the block, scale the computed differences according to the table of scaling factors, and add the scaled differences to the converted color value to convert the color values of the pixels in the block to the output color space, wherein the conversion engine is further operable to determine a center pixel from the block of pixels and assign a color value of the output color space to the center pixel according to the color conversion table, wherein the center pixel has a color value in the input color space prior to conversion, wherein the conversion engine is further operable to compute differences between the color values of all other pixels in the block and the color value of the center pixel, wherein the conversion engine is further operable to determine when a computed color value difference of a pixel in the block breaches a threshold color value and convert the color value of the pixel to the output color space according to the color conversion table when the difference breaches said threshold.

6. The color conversion system of claim 4, wherein the conversion engine is further operable to generate the scaling factors as a function of color values in the output color space per component of color values in the input color space.

7. The color conversion system of claim 4, wherein the input color space is a CMYK color space and the output color space is a grayscale color space.

8. The color conversion system of claim 4, further comprising a transform domain converter operable to generate the real domain image data from a JPEG compressed image via an inverse discrete cosine transform.

9. A printing system, comprising:

a printer;

an imaging device operable to generate image data having color values defined in a first color space; and a printer controller wherein the printer controller comprises:

a color conversion table comprising color values defined in the output color space corresponding to color values in the input color space;

a table of scaling factors;

a conversion engine operable to group the real domain image data into blocks of pixels, and for each block of pixels, convert a color value in the block of pixels from the first color space to the second color space according to the lookup table, compute differences between the color value and color values of pixels in the block, scale the computed differences according to a table of scaling factors and add the scaled differences to the converted color value to convert the color values of the pixels in the block to the second color space, wherein the conversion engine is further operable to determine an average color value for the block of pixels and convert the average color value to the output color space according to the color conversion table, wherein the conversion engine is further operable to compute differences between all color values of pixels in the block and the average color value, wherein the conversion engine is further operable to determine when a computed color value difference of a pixel in the block breaches a threshold color value and convert the color value of the pixel to the output color space according to the color conversion table when the difference breaches said threshold.

* * * * *